United States Patent
Reyes et al.

(10) Patent No.: US 11,700,574 B2
(45) Date of Patent: *Jul. 11, 2023

(54) SYSTEMS AND METHODS FOR PRODUCER NETWORK FUNCTION DISCOVERY IN A WIRELESS NETWORK BASED ON GEOGRAPHIC LOCATION

(71) Applicant: Verizon Patent and Licensing Inc., Basking Ridge, NJ (US)

(72) Inventors: Emerando M. Delos Reyes, Pleasant Hill, CA (US); Taral Patel, Piscataway, NJ (US); Sudhakar Reddy Patil, Flower Mound, TX (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,252

(22) Filed: May 6, 2022

(65) Prior Publication Data

US 2022/0264432 A1 Aug. 18, 2022

Related U.S. Application Data

(63) Continuation of application No. 16/891,725, filed on Jun. 3, 2020, now Pat. No. 11,356,934.

(51) Int. Cl.
*H04W 4/00* (2018.01)
*H04W 48/16* (2009.01)
*H04W 76/11* (2018.01)
*H04W 4/02* (2018.01)
*H04W 72/563* (2023.01)

(52) U.S. Cl.
CPC .......... *H04W 48/16* (2013.01); *H04W 4/025* (2013.01); *H04W 72/563* (2023.01); *H04W 76/11* (2018.02)

(58) Field of Classification Search
CPC ... H04W 48/16; H04W 76/11; H04W 72/563; H04W 4/025
USPC ....................................................... 370/329
See application file for complete search history.

(56) References Cited

U.S. PATENT DOCUMENTS

2020/0305062 A1* 9/2020 Kharvar .............. H04W 40/246
2021/0044628 A1 2/2021 Foti
2021/0058990 A1 2/2021 Talebi Fard et al.

* cited by examiner

*Primary Examiner* — Temica M Beamer

(57) ABSTRACT

A system described herein may provide a technique for location-based handling of discovery requests in a service-based network in which different instances of network functions ("NFs") may be deployed in geographically diverse locations. For example, a Network Repository Function ("NRF") may maintain location information for the various NF instances and may respond to discovery requests by identifying particular NF instances based on locations associated with the discovery requests. For example, such discovery requests may include a "preferred-locality" parameter or some other indication of location associated with the discovery request, based on which the NRF may identify one or more NF instances to provide in response to the discovery request.

20 Claims, 9 Drawing Sheets

SYSTEMS AND METHODS FOR PRODUCER NETWORK FUNCTION DISCOVERY IN A WIRELESS NETWORK BASED ON GEOGRAPHIC LOCATION

CROSS-REFERENCE TO RELATED APPLICATION

This Application is a Continuation of U.S. patent application Ser. No. 16/891,725, filed on Jun. 3, 2020, titled "SYSTEMS AND METHODS FOR PRODUCER NETWORK FUNCTION DISCOVERY IN A WIRELESS NETWORK BASED ON GEOGRAPHIC LOCATION," the contents of which are herein incorporated by reference in their entirety.

BACKGROUND

Wireless networks may implement network functions ("NFs") using configurable hardware resources, such as "cloud" computing resources, virtual machines, or the like. Such resources may be geographically distributed, and a Network Repository Function ("NRF") may maintain network topology information. The NRF may respond to discovery requests by indicating an Internet protocol ("IP") address or other identifier for a particular NF in response to a request for an identifier of a particular type of NF. For example, during the course of network operations, such as registering a User Equipment ("UE") with the network, forming communication pathways between various NFs, and/or other operations, one NF (referred to as a "consumer" NF) may request, from the NRF, an identifier of one or more other NFs (referred to as "producer" NFs) from which the consumer NF may obtain services, information, or the like.

DETAILED DESCRIPTION OF THE PREFERRED EMBODIMENTS

The following detailed description refers to the accompanying drawings. The same reference numbers in different drawings may identify the same or similar elements.

Embodiments described herein provide for location-based handling of discovery requests in a service-based network in which different instances of NFs may be deployed in geographically diverse locations. For example, a Fifth Generation ("5G") core network may include NFs that are implemented by configurable resources deployed in geographically diverse locations, such that different instances of the same NF may be deployed in different geographic locations (e.g., different cities, states, provinces, etc.). NFs that are implemented by configurable hardware may sometimes be referred to as virtual NFs ("VNFs"). For the sake of brevity, the term "NF," as used herein, is also intended to refer to VNFs. In some situations, a given NF (referred to as a "consumer" NF) may request, from an NRF associated with the network, an identifier of a particular producer NF from which the consumer NF may require information or services, and/or for which a communicative pathway may need to be otherwise established.

In accordance with embodiments described herein, the NRF may be able to respond to such requests in a manner that takes location in to account, such that the consumer NF is able to communicate with an instance of a given producer NF that is relatively close to the consumer NF (e.g., is selected based on location of the producer NF, the consumer NF, and/or the NRF). Because geographical distance is a factor in the speed of communications between the consumer NF and producer NFs, selecting producer NFs based on location may improve the speed (e.g., reduce latency) of communications between the consumer NF and the selected producer NF(s). Further, network and/or processing resources may be conserved by selecting producer NFs based on location, as fewer network elements may be needed to carry network traffic between the consumer NF and selected producer NFs when such producer NFs are selected based on location.

Figure 1:
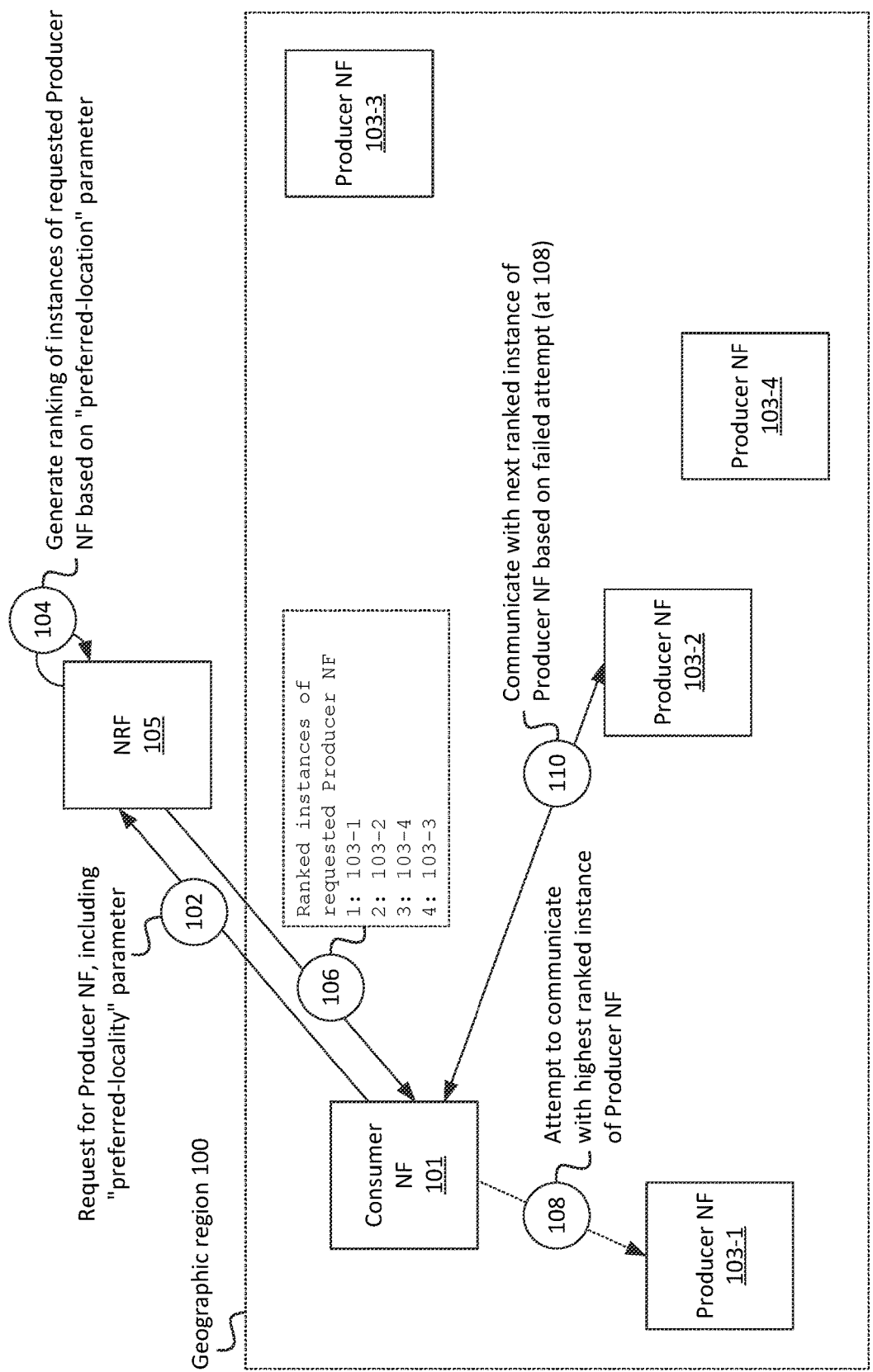
FIG. 1 illustrates an example overview of one or more embodiments described herein, in which one or more producer NFs may be identified and provided in response to a request from a consumer NF, where the request indicates a geographic location associated with the consumer NF.

As shown in FIG. 1, for example, a particular consumer NF 101 may be located in a particular geographic region 100. A set of instances of a given producer NF 103 may also be located in the same particular geographic region. For example, producer NFs 103-1 through 103-4 (e.g., four instances of the same type of producer NF) may be located in geographic region 100. While described here in the context of the general terms "consumer NF" and "producer NF," in practice, concepts described here may be applied to particular types of consumer NFs and/or producer NFs. For example, such concepts may apply when the consumer NF is an Access and Mobility Management Function ("AMF"), Serving Gateway ("SGW"), and/or other type of NF. As another example, such concepts may apply when the producer NF is a Policy Control Function ("PCF"), Unified Data Management function ("UDM"), Charging Function ("CHF"), Subscription Locator Function ("SLF"), and/or other type of NF.

In this figure, assume that the distances within geographic region 100 are generally to scale. For example, the physical distance between producer NF 103-1 and consumer NF 101 may be less than the physical distance between NF 103-3 and consumer NF 101. For example, a location of a data center in which hardware, that implements producer NF 103-1, is located may be relatively close to a data center in which hardware, that implements consumer NF 101, is located. Meanwhile, a location of a data center in which hardware, that implements producer NF 103-3, is located may be relatively far from (or less close to) the data center in which hardware, that implements consumer NF 101, is located. In some embodiments, consumer NF 101 and/or each instance of producer NF 103 may otherwise be associated with a particular geographical location within geographical region 100. For example, upon instantiation or registration of consumer NF 101 and/or producer NFs 103, NRF 105 and/or some other device or system may receive and/or maintain information indicating the respective geographical locations of consumer NF 101 and/or producer NFs 103.

As shown, consumer NF 101 may output (at 102) a request to NRF 105. The request may be a discovery request, and/or some other type of request, for a particular instance of producer NF 103. For example, as mentioned above, the network with which consumer NF 101, producer NFs 103, and NRF 105 is associated with may be implemented with various instances of the same NF (e.g., instances of producer NF 103) distributed across diverse geographic locations, such as the multiple instances of producer NF 103 located within geographic region 100. Further, the request (at 102) may include an indication of a location associated with consumer NF 101, and/or may include an indication of a desired location of the particular instance of producer NF 103. For example, the request may include a "preferred-locality" parameter. Additionally, or alternatively, NRF 105 may determine the "preferred-locality" parameter based on a previously determined or maintained location associated with consumer NF 101. For example, during a provisioning or registration process associated with consumer NF 101, NRF 105 may have received information indicating a geographic location associated with consumer NF 101 (e.g., a geographic location of configurable resources used to implement consumer NF 101).

NRF 105 may generate (at 104) a ranking of instances of the requested producer NF 103 based on the received (or otherwise determined) "preferred-locality" parameter associated with the request. For example, NRF 105 may determine a distance (e.g., a geographical straight-line distance) between the location specified via the "preferred-locality" parameter (e.g., as included in the request and/or otherwise determined by NRF 105) and one or more of the locations associated with the various instances of producer NFs 103.

In some embodiments, NRF 105 may generate the ranking using one or more other types of criteria in addition to, or in lieu of, the distance between the location specified via the "preferred-locality" parameter and the one or more of the locations associated with the various instances of producer NFs 103. For example, NRF 105 may generate the ranking based on network load associated with producer NFs 103 (e.g., may reduce a ranking of a particular instance of producer NF 103 if such instance of producer NF 103 is experiencing relatively high load or congestion), Quality of Service ("QoS") or Service-Level Agreements ("SLAs") associated with consumer NF 101 (and/or to one or more UEs communicatively coupled with consumer NF 101), routing topology between consumer NF 101 and instances of producer NF 103 (e.g., quantity of routing hops, distance of fibers or other network propagation hardware, etc.), and/or other criteria. For the sake of simplicity, examples described herein are provided solely in the context of straight-line distance between consumer NF 101 and instances of producer NF 103 being the determinative factor based on which instances of producer NF 103 are ranked in response to discovery requests from consumer NF 101.

In this example, NRF 105 may provide (at 106) the following ranking of instances of producer NF 103: producer NF 103-1, producer NF 103-2, producer NF 103-4, and producer NF 103-3. That is, NRF 105 may indicate that producer NF 103-1 is the closest to consumer NF 101, and that producer NF 103-3 is the farthest from consumer NF 101. In some embodiments, NRF 105 may only provide a predetermined quantity of producer NFs 103 (e.g., the three closest producer NFs 103), and/or may provide producer NFs 103 that are located within a predetermined threshold distance of consumer NF 101 (e.g., within 10 kilometers of consumer NF 101, within the same geographic region 100, etc.). In some embodiments, the ranking may include an IP address or portion thereof (e.g., an IPv6 address, an IP prefix, etc.), a Fully Qualified Domain Name ("FQDN"), hostname, and/or other suitable identifier for each instance of producer NF 103.

Based on the received (at 106) ranking, consumer NF 101 may attempt (at 108) to communicate with the highest-ranked instance of producer NF 103. For example, as shown, consumer NF 101 may attempt (at 108) to communicate with producer NF 103-1. In this example, the attempt may be unsuccessful, as indicated by the dashed line. For example, producer NF 103-1 may be overloaded, may be non-operational, communication fibers or other pathways between consumer NF 101 and producer NF 103-1 may be non-operational or degraded, and/or the communication attempt may be unsuccessful for some other reason.

Based on the unsuccessful communication (at 108) between consumer NF 101 and producer NF 103-1, consumer NF 101 may attempt (at 110) to communicate with the next instance of producer NF 103 in the ranking (i.e., producer NF 103-2, in this example). In this example, the communication between consumer NF 101 and producer NF 103-2 may be successful (e.g., producer NF 103-2 may respond to a request or other communication from consumer NF 101). If at some point the communication between consumer NF 101 and producer NF 103-2 fails, consumer NF 101 may attempt to connect to a different instance of producer NF 103, in the order indicated in the ranking. Further, since the highest ranked producer NF 103 failed (at 108), consumer NF 101 may periodically or intermittently attempt to communicate with producer NF 103-1. In situations where producer NF 103-1 becomes available, consumer NF 101 may begin to communicate with producer NF 103-1 in lieu of producer NF 103-2 (or some other lower ranked instance of producer NF 103).

Because consumer NF 101 received (at 106) an indication of instances of producer NF 103 based on a location associated with consumer NF 101 (e.g., based on the "preferred-location" parameter provided (at 102) by consumer NF 101 and/or otherwise determined by NRF 105), services provided by producer NF 103 to consumer NF 101 may exhibit a lower latency and/or may consume fewer resources than if a farther away instance (e.g., producer NF 103-3) were selected for communications with consumer NF 101.

Figure 2A:
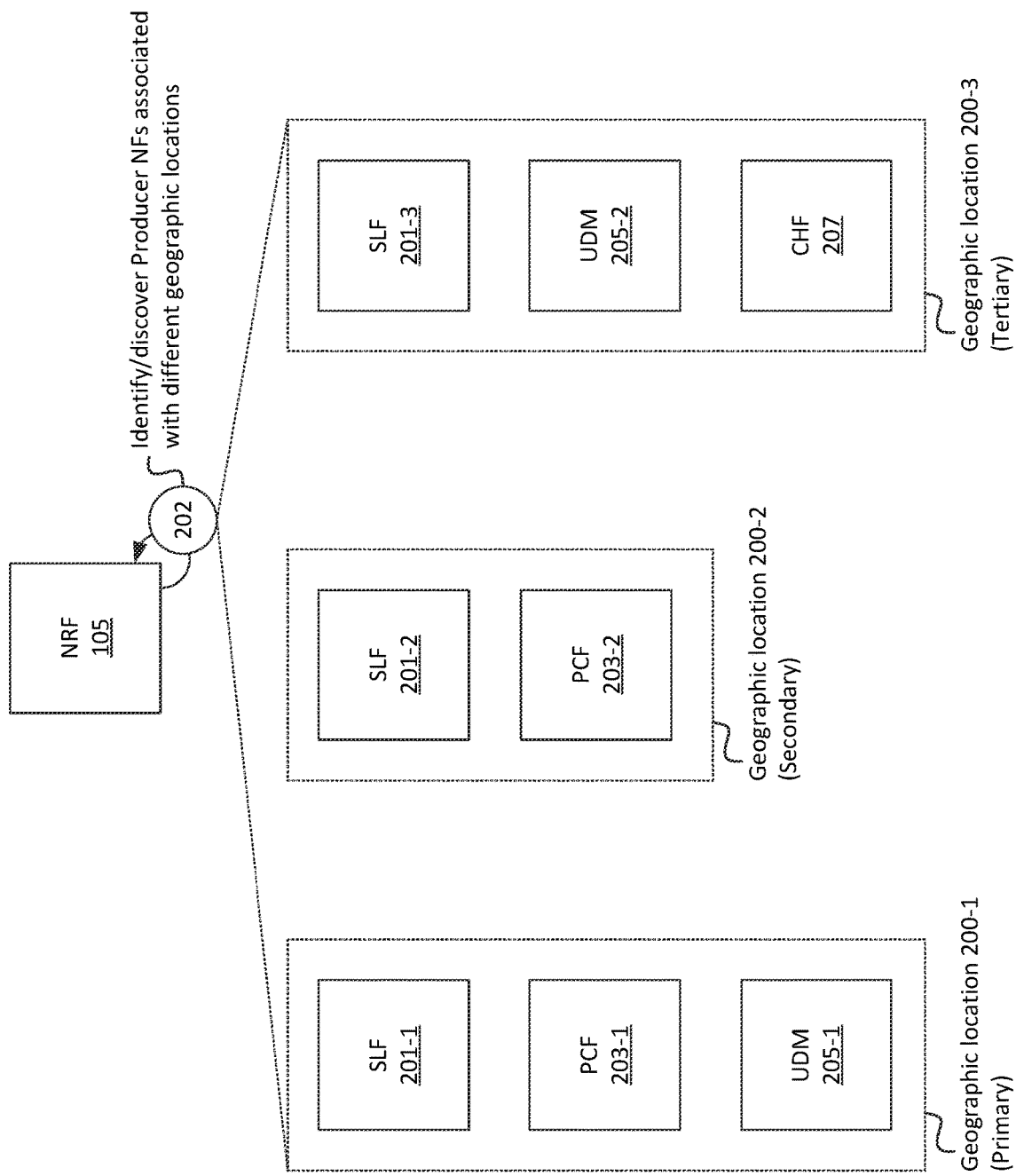
FIGS. 2A and 2B illustrate an example overview of one or more embodiments described herein, in which an NRF may be associated with particular geographic locations and may respond to discovery requests from a consumer NF based on the particular geographic locations associated with the NRF.

In some embodiments, as shown in FIG. 2A, NRF 105 may be associated with different geographic locations 200. In this example, NRF 105 is associated with geographic locations 200-1, 200-2, and 200-3. For example, geographic location 200-1 may be designated as a "primary" location associated with NRF 105, geographic location 200-2 may be designated as a "secondary" location associated with NRF 105, and geographic location 200-3 may be designated as a "tertiary" location associated with NRF 105. In some embodiments, additional or fewer locations 200 may be associated with NRF 105.

For example, such locations 200 may be designated for NRF 105 during a provisioning, registration, instantiation, discovery, etc. process (at 202) performed by NRF 105. For example, a Domain Name System ("DNS") server, a Global Server Load Balancing ("GSLB") system, and/or other suitable device or system may maintain topology and/or location information associated with a set of NFs, which may include consumer NFs and/or producer NFs, associated with a network (e.g., a core of a wireless network). NRF 105 may receive, from the DNS server, GSLB system, and/or from some other source, information indicating the locations of various NFs associated with the network. NRF 105 may identify particular locations at which groups or clusters of NFs are located, and may generate or identify particular geographic locations 200 based on such locations.

For example, NRF 105 may receive information indicating that a relatively large quantity (e.g., at least a threshold quantity, and/or a higher concentration or quantity than surrounding locations) of NFs are located in (e.g., are implemented by configurable hardware that is located in) or near geographic location 200-1, that a relatively large quantity of NFs are located in geographic location 200-2, and that a relatively large quantity of NFs are located in geographic location 200-3. Based on the information indicating that locations 200-1, 200-2, and 200-3 are locations at which clusters or groups of NFs are located, NRF 105 may determine that such locations 200-1, 200-2, and 200-3 are potential locations to be used for further operations described herein. In some embodiments, NRF 105 may receive information identifying locations 200-1, 200-2, and/or 200-3 from the DNS server, GSLB system, and/or some other source.

NRF 105 may, for example, set geographic location 200-1 as the "primary" location with respect to NRF 105 based on determining that geographic location 200-1 is physically closest to a location associated with NRF 105. For example, NRF 105 may determine that a data center or other hardware that implements NFs that are located in (or within a threshold distance of) geographic location 200-1 are relatively closer to a data center or other hardware that implements NRF 105, than a data center or other hardware that implements NFs that are located in or near locations 200-2 and/or 200-3. Similarly, NRF 105 may set geographic location 200-2 as a "secondary" location based on determining that a data center or other hardware that implements NFs are located closer to NRF 105 than a data center or other hardware that implements NFs that are located in or near location 200-3 (but farther than a data center or other hardware that implements NFs that are located in or near location 200-1).

In this example, geographic location 200-1 is associated with SLF 201-1, PCF 203-1, and UDM 205-1. For example, SLF 201-1, PCF 203-1, and UDM 205-1 may be implemented by one or more data centers or other hardware that are located at, or within a particular threshold distance of, geographic location 200-1. As further shown, geographic location 200-2 is associated with SLF 201-2 and PCF 203-2, and geographic location 200-3 is associated with SLF 201-3, UDM 205-2, and CHF 207. For example, after (or in conjunction with) the identification of locations 200-1, 200-2, and 200-3 associated with NRF 105, NRF 105 may receive information indicating locations associated with respective instances of NFs 201, 203, 205, and 207 (referred to herein as "NFs 201-207"), based on which NRF 105 may associate (at 202) such instances of NFs 201-207 with respective locations 200.

As shown, some NFs may be present at all of locations 200 (e.g., SLF 201-1), while one or more NFs may be present at fewer than all of locations 200 (e.g., instances of PCF 203 are located at locations 200-1 and 200-2 but not at location 200-3). Further, not all NFs may be present at primary location 200-1. In this example, for instance, CHF 207 is located at tertiary geographic location 200-3 but not at primary or secondary locations 200-1 or 200-2. As described below, the presence of NFs at a given geographic location 200 associated with NRF 105 may be a criteria based on which NRF 105 responds to discovery requests (e.g., from a consumer NF). That is, in such a context, each of the NFs 201-207 shown in FIG. 2A may be a producer NF. In other contexts, such as when NFs 201-207 output discovery requests to NRF 105, such NFs may be considered consumer NFs in such contexts. For the purposes of explanation, NFs 201-207 are discussed herein solely in the context that such NFs are producer NFs; however concepts described with regard to consumer NFs may apply in contexts where these NFs are consumer NFs.

In some embodiments, NRF 105 may receive configuration information from one or more other NRFs 105. For example, when performing a discovery process to identify NFs 201-207, NRF 105 may also discover instances of one or more other NRFs. In some embodiments, the other NRFs may be configured with network topology information, such as information indicating locations associated with particular NFs (e.g., instances of NFs 201-207). In such embodiments, NRF 105 may receive some or all of the information, indicating locations of instances of NFs 201-207, from one or more other NRFs. In this manner, NRFs may propagate network information to each other, in some embodiments.

Further, in some embodiments, NRF 105 may configure locations 200 (e.g., as primary, secondary, tertiary, etc.) based on the configuration of one or more neighboring NRFs (e.g., NRFs located closest to NRF 105, out of a set of NRFs, and/or NRFs located within a threshold distance of NRF 105). For example, if NRF 105 receives information indicating that a co-located NRF (e.g., located at the same location as NRF 105 or within a threshold distance of NRF 105) is associated with location 200-2 as a primary location, then NRF 105 may refrain from designating location 200-2 as a primary location. That is, in some embodiments, the association of certain locations 200 as being associated with a particular NRF (e.g., as primary, secondary, etc. locations) may be a factor in the determination of whether such locations 200 are associated with NRF 105, and/or whether such locations 200 are designated as primary, secondary, etc. locations for NRF 105.

Figure 2B:
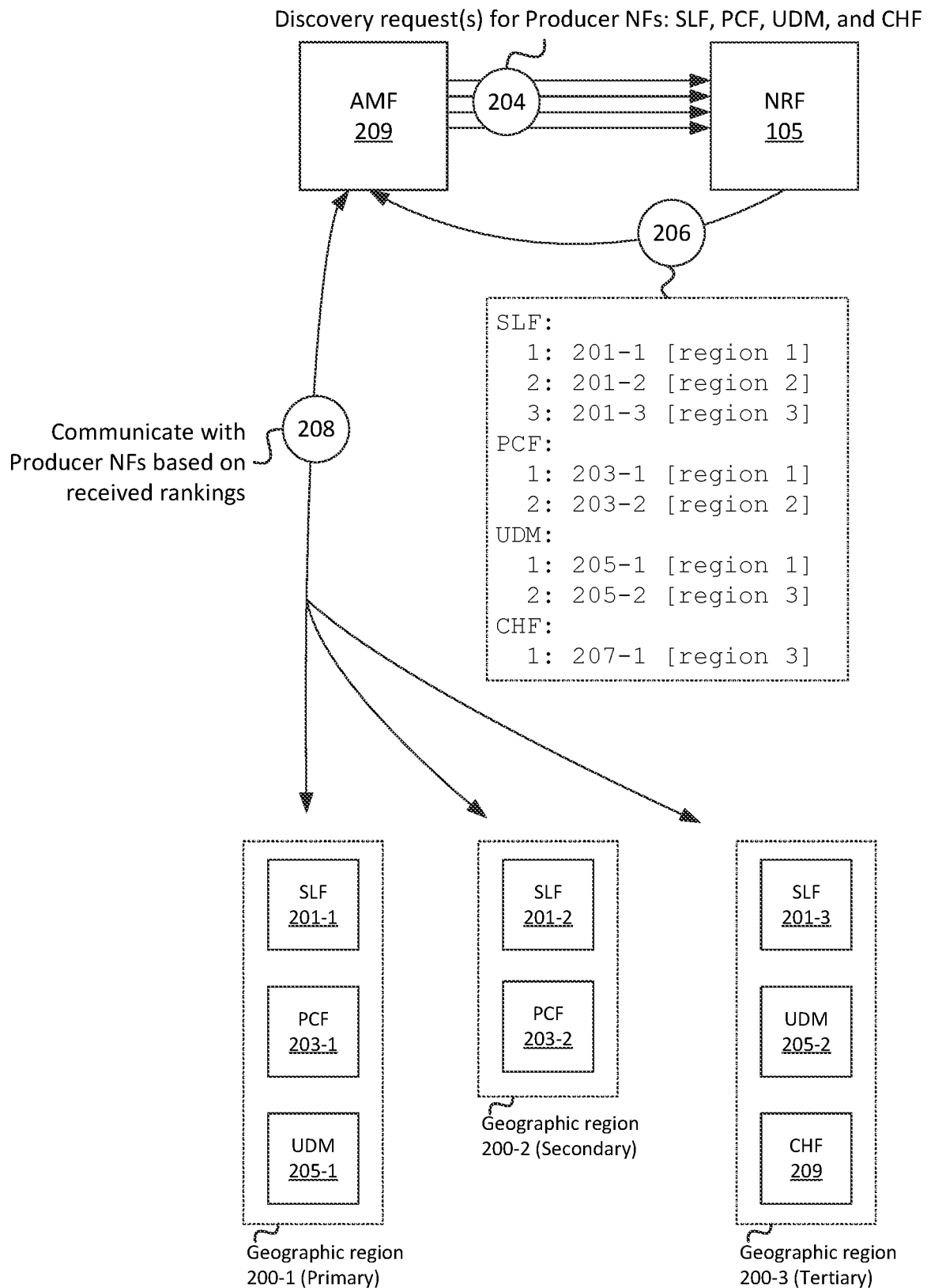

Referring to FIG. 2B, once NRF 105 has associated (e.g., at 202) instances of NFs 201-207 with respective locations 200-1, 200-2, and/or 200-3, NRF 105 may receive (at 204) one or more discovery requests from AMF 209. That is, in this scenario, AMF 209 may be a consumer NF in this context, requesting discovery of one or more producer NFs. In this example, AMF 209 may request information (e.g., IP addresses, FQDNs, etc.) associated with SLF 201, PCF 203, UDM 205, and CHF 207. As similarly noted above, once AMF 209 receives such information, AMF 209 may communicate with (or attempt to communicate with) such NFs in order to receive services provided by such NFs.

Once NRF 105 receives the discovery request(s) from AMF 209, NRF 105 may generate (at 206) a ranking of instances of requested NFs 201-207. In some embodiments, the ranking may be based on the presence of such NFs 201-207 in respective locations 200 associated with NRF 105. For example, as shown, ranking 206 of SLF 201 may be in the following order (e.g., ranked closest to farthest from NRF 105): SLF 201-1, SLF 201-2, and SLF 201-3. For example, NRF 105 may identify that SLF 201-1 is located in primary geographic location 200-1, that SLF 201-2 is located in secondary geographic location 200-2, and that SLF 201-3 is located in tertiary geographic location 200-3. As further shown, ranking 206 of PCF 203 may be in the following order: PCF 203-1 and PCF 203-2 (associated with geographic locations 200-1 and 200-2, respectively); ranking 206 of UDM 205 may be in the following order: UDM 205-1 and UDM 205-2 (associated with geographic locations 200-1 and 200-3, respectively); and CHF 207 may be indicated by ranking 206 as having only one available instance in this situation (e.g., located at geographic location 200-3).

Based on ranking 206, AMF 209 may communicate (at 208), or attempt to communicate, with respective instances of SLF 201-207 based on the ranking. For example, as similarly described above, when communicating with SLF 201, AMF 209 may first attempt to communicate with SLF 201-1 and, if such communication is unsuccessful, then AMF 109 may attempt to communicate with SLF 201-2 (and so on).

In the manner described above with respect to FIGS. 2A-2B, the location of NRF 105 may be a criteria and/or a determining factor based on which NRF 105 may respond to discovery requests. In some embodiments, NRF 105 may respond to consumer NF discovery requests on the basis of determined locations 200 of NFs 201-207 (e.g., as described with respect to FIGS. 2A-2B) in situations where discovery requests (e.g., at 204) do not include an indication of a location associated with the consumer NF (e.g., a "preferred-location" parameter).

Additionally, or alternatively, NRF 105 may respond to consumer NF discovery requests on the basis of determined locations 200 of NFs 201-207 if a discovery request includes a "preferred-location" parameter but NRF 105 is unable to identify at least a threshold quantity of suitable producer NFs. For example, if a particular discovery request includes a discovery request for an instance of SLF 201, and includes a "preferred-location" parameter indicating a particular geographic location, assume that NRF 105 is able to locate at least a threshold quantity of SLFs 201 (e.g., at least three SLFs 201) located at or within a threshold distance of the indicated preferred location. In this situation, since NRF 105 was able to identify at least the threshold quantity of producer NFs associated with the "preferred-location" parameter, NRF 105 may return these three identified producer NFs (e.g., not on the basis of locations 200 as described with respect to FIGS. 2A-2B).

On the other hand, assume that a particular discovery request includes a discovery request for an instance of PCF 203, and also includes the "preferred-location" parameter. Assume further that NRF 105 does not identify at least a threshold quantity of instances of PCF 203 at or near (e.g., within a threshold distance of) the indicated preferred location. For example, NRF 105 may identify one instance of PCF 203 at or near the indicated preferred location, and/or may identify no instances of PCF 203 at or near the indicated preferred location.

In such a situation, NRF 105 may return a ranked list of instances of PCF 203 that includes instances that were identified based on geographic locations 200. For example, NRF 105 may identify one or more instances of producer NF 103 based on distance from the "preferred-location" parameter (if applicable), and/or may identify one or more instances of producer NF 103 based on prior identification of such instances of producer NF 103 as being associated with one or more locations 200. In some embodiments, the discovery request may include a "preferred-location" parameter (or other indicator of location), and NRF 105 may disregard or overwrite such parameter. For example, if the "preferred-location" parameter in a given discovery request from a given consumer NF is greater than a threshold distance from a location of NRF 105, or is greater than a threshold distance from one or more determined locations 200 associated with NRF 105, NRF 105 may return a ranking based on locations 200 (e.g., as described with regard to FIGS. 2A-2B) rather than based on the "preferred-location" parameter included in the discovery request.

Figure 3:
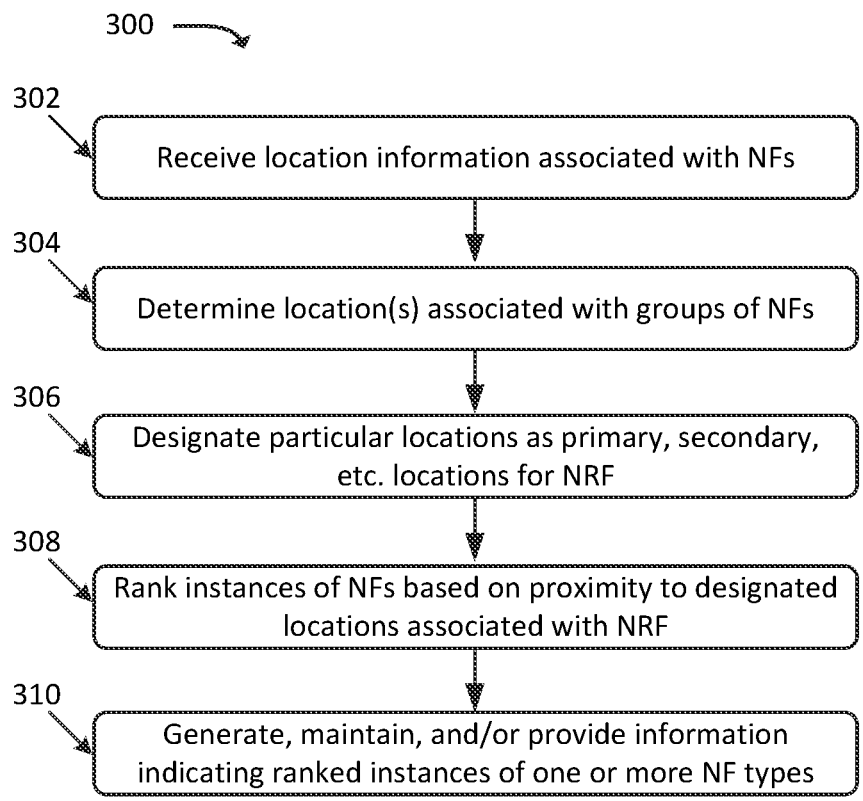
FIG. 3 illustrates an example process for generating, maintaining, and/or providing information indicating a ranked set of instances of one or more NFs based on designated locations associated with an NRF, in accordance with some embodiments.

FIG. 3 illustrates an example process 300 for generating, maintaining, and/or providing information indicating a ranked set of instances of one or more NFs based on designated locations (e.g., designated locations associated with a particular NRF 105), in accordance with some embodiments. In some embodiments, some or all of process 300 may be performed by NRF 105. In some embodiments, one or more other devices may perform some or all of process 300 in concert with, and/or in lieu of, NRF 105.

As shown, process 300 may include receiving (at 302) location information associated with a set of NFs of a wireless network. As noted herein, such NFs may include a SLF, CHF, AMF, UDM, and/or other type of NF. As also discussed herein, the network may include multiple instances of one or more of these NFs, such that different instances may be geographically distributed. NRF 105 may receive location information as part of an instantiation, provisioning, configuration, etc. process associated with NRF 105. For example, as discussed above, NRF 105 may output a discovery request to a DNS server, one or more other NRFs, a GSLB system, and/or some other device or system that provides location information associated with the various NF instances associated with the network.

Process 300 may further include determining (at 304) one or more locations associated with one or more groups of NFs for which location information has been received. For example, NRF 105 may identify locations at which at least a threshold quantity of NFs are located (e.g., within a threshold distance of such locations and/or each other), and/or may perform some other suitable type of analysis to associate each NF instance (for which information was received at 302) with a particular location or region.

Process 300 may additionally include designating (at 306) particular locations, of the determined locations, as primary, secondary, tertiary, etc. locations associated with NRF 105. For example, a first one of the locations, that is geographically closest to a location of NRF 105 may be designated as a primary location. Further, a second one of the locations, that is next closest to the location of NRF 105, may be designated as a secondary location, and so on. As discussed above, some types of NFs may be present at all such locations, while some types of NFs may not be present at all such locations. That is, not necessarily all of the determined locations may be associated with all available NF types.

In some embodiments, NRF 105 may rank the locations according to other criteria, such as quantity of routing hops between NRF 105 and NFs associated with a given location (e.g., an average quantity of hops, a median quantity of hops, a minimum quantity of hops, a maximum quantity of hops, and/or some other measure or calculation), performance metrics between NRF 105 and NFs associated with a given location (e.g., throughput and/or latency between NRF 105 and NFs associated with a given location), a measure of load associated with NFs at a given location, and/or some other suitable criteria.

Process 300 may also include ranking (at 308) instances of NFs based on their proximity to locations associated with NRF 105. For example, an instance of a particular type of NF that is located at (or within a threshold distance of) a primary location may be ranked higher than instances of the same type of NF that are located farther away from the primary location. In some embodiments, NRF 105 may determine a distance of a given NF instance from a primary designated location, a second designated location, and a third designated location associated with NRF 105 (e.g., as determined at 304). NRF 105 may, in some embodiments, associate the NF instance with the designated location (e.g., out of the primary, secondary, and tertiary designated locations, in this example) that is closest to the NF instance.

Process 300 may further include generating, maintaining, and/or providing (at 310) information indicating the ranked instances of the one or more NF types. For example, NRF 105 may provide this ranking information in response to discovery requests received from one or more consumer NFs, in which the consumer NFs may specify one or more requested NF types. In some embodiments, NRF 105 may maintain and/or provide the ranking information with one or more identifiers of the ranked NF instances. For example, as discussed above, the identifiers may include IP addresses, FQDNs, and/or other suitable identifiers based on which a consumer NF may communicate with, or otherwise discover, the NF instances. In some embodiments, and as discussed below, NRF 105 may respond to discovery requests in a manner that is partially based on the ranking of NF instances according to proximity to designated locations associated with NRF 105 (e.g., as described with respect to process 300) and is partially based on one or more other techniques for ranking the NF instances.

Figure 4:
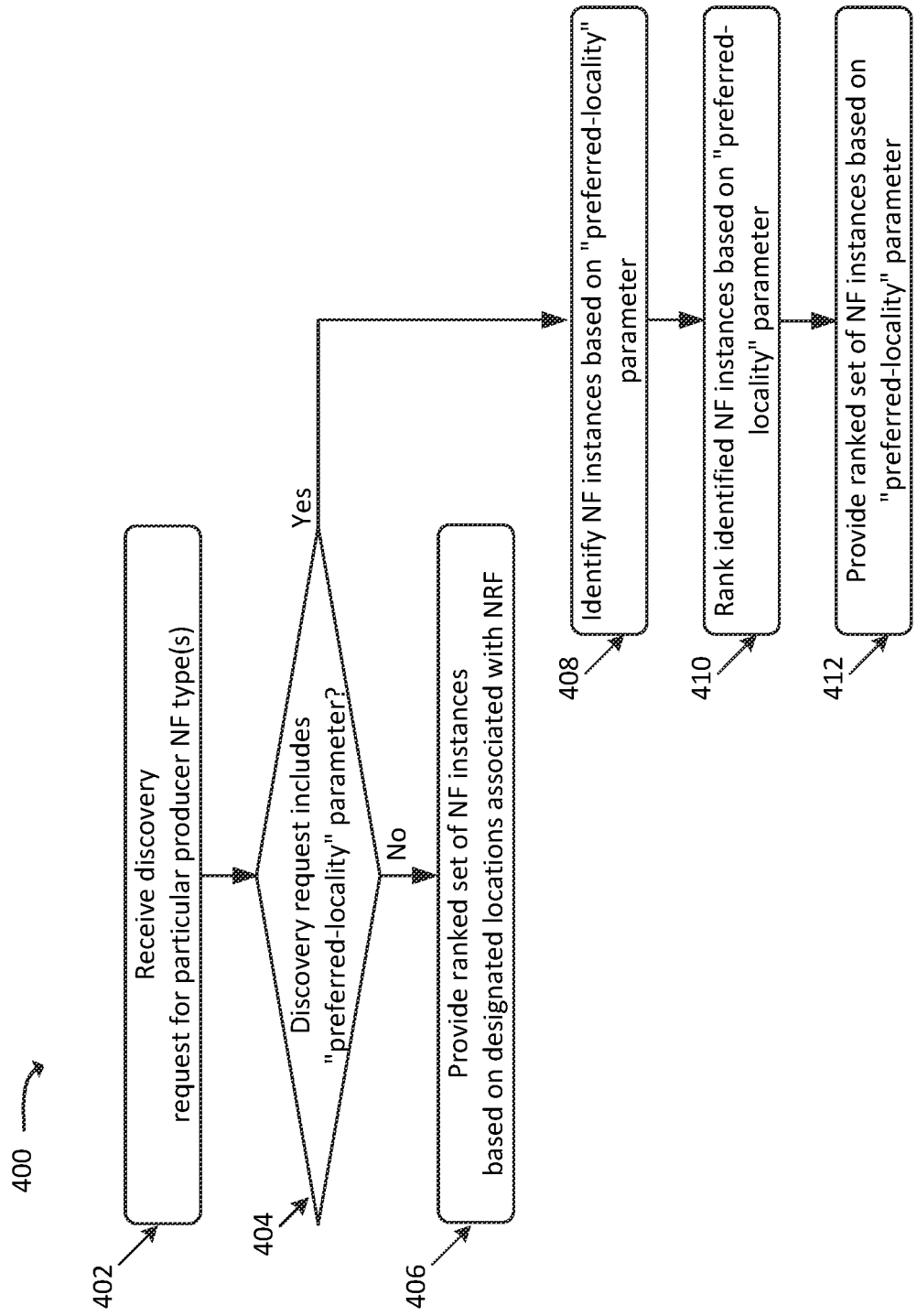
FIG. 4 illustrates an example process for providing a ranked set of instances of one or more NFs based on a location specified in a request from a consumer NF.

For example, FIG. 4 illustrates an example process 400 for providing a ranked set of instances of one or more NFs based on a location specified in a request from a consumer NF. In some embodiments, some or all of process 400 may be performed by NRF 105. In some embodiments, one or more other devices may perform some or all of process 400 in concert with, and/or in lieu of, NRF 105.

As shown, process 400 may include receiving (at 402) a discovery request for one or more particular producer NF types. For example, the discovery request may be received from a consumer NF associated with a network, and may specify one or more producer types of producer NFs (e.g., SLF, CHF, UDM, etc.) from which the consumer NF may attempt to obtain services and/or with which the consumer NF may otherwise communicate. In some embodiments, the discovery request may be received from another NRF associated with the network. For example, the other NRF may output the discovery request during a provisioning or instantiation process, and/or during a periodic or intermittent update process whereby the other NRF updates records indicating locations of NFs associated with the network.

Process 400 may further include determining (at 404) whether the discovery requests includes an indication of location, such as a "preferred-locality" parameter. Additionally, or alternatively, as discussed above, NRF 105 may determine whether NRF 105 has access to, or is otherwise able to determine, location information associated with the NF from which the discovery request was received. If the discovery request does not include the "preferred-locality" parameter or some other indicator of location, and/or if NRF 105 is unable to determine a location associated with the requesting NF (at 404—NO), process 400 may additionally include providing (at 406) a ranked set of NF instances (e.g., according to the requested type(s) of NFs) in response to the discovery request. For example, NRF 105 may output a ranked list of the requested type(s) of NFs that was generated (e.g., as discussed above with respect to process 300) based on designated locations associated with NRF 105.

If, on the other hand, the discovery request includes the "preferred-locality" parameter or some other location indication, and/or if NRF 105 is otherwise able to determine a location associated with the requesting NF (at 404—YES), then process 400 may include identifying (at 408) one or more NF instances based on the "preferred-locality" parameter (and/or other indication of location associated with the requesting NF). For example, NRF 105 may identify NF instances (e.g., of the requested type(s)) that are located within a particular threshold distance from the location associated with the request (e.g., indicated by the "preferred-locality" parameter or otherwise determined by NRF 105).

Process 400 may further include ranking (at 410) the NF instances identified based on the "preferred-locality" parameter (or other indication of location associated with the requesting consumer NF). For example, NRF 105 may rank the identified NF instances in order, based on distance from the location associated with the requesting NF. For example, as discussed above, a highest ranked instance of a particular NF may be the closest instance of that particular NF type to the location associated with the consumer NF.

Process 400 may additionally include providing (at 412) the set of instances ranked based on the "preferred-locality parameter (or other indication of location associated with the consumer NF). For example, NRF 105 may provide, as a response to the discovery request (received at 402), the ranked set of instances to the consumer NF from which the discovery request was received. As discussed above, the consumer NF may communicate with the requested producer NF instance(s) based on the ranking. For example, the consumer NF may first communicate (or attempt to communicate) with a highest ranking producer NF and, if the communication is unsuccessful, communicate (or attempt to communicate) with a next-highest ranking producer NF, and so on.

Figure 5:
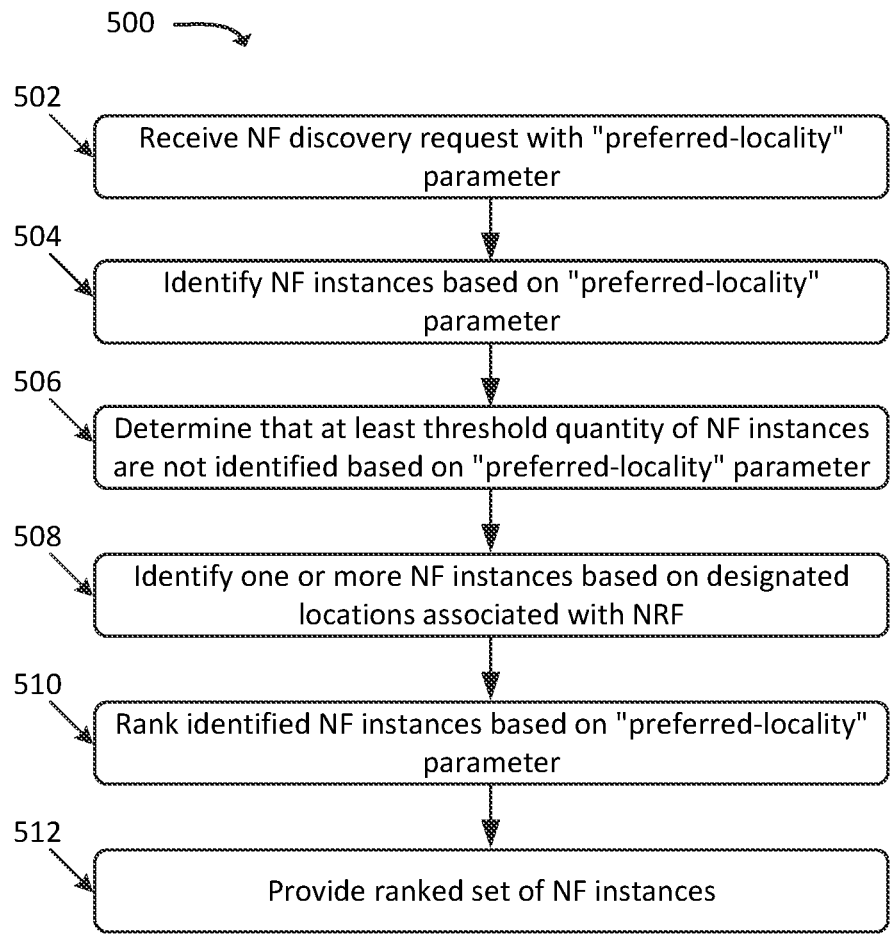
FIG. 5 illustrates an example process for providing a ranked set of NF instances, in response to a request from a consumer NF that specifies a location, where the ranked set of NF instances includes one or more NF instances identified based on designated locations associated with an NRF.

FIG. 5 illustrates an example process 500 for providing a ranked set of NF instances, in response to a request from a consumer NF that specifies a location, where the ranked set of NF instances includes one or more NF instances identified based on designated locations associated with an NRF. As discussed below, portions of process 500 may coincide with portions of process 400, described above. In some embodiments, some or all of process 500 may be performed by NRF 105. In some embodiments, one or more other devices may perform some or all of process 500 in concert with, and/or in lieu of, NRF 105.

As shown, process 500 may include receiving (at 502) a discovery request for one or more NF types, where the request includes a "preferred-locality" parameter (and/or for which NRF 105 is otherwise able to determine a location associated with a consumer NF from which the request was received). In some embodiments, block 502 of process 500 may correspond to blocks 402 and 404—YES of process 400.

Process 500 may also include identifying (at 504) one or more NF instances based on the "preferred-locality" parameter (or otherwise based on the location of the consumer NF from which the request was received). For example, as discussed above with respect to block 408 of process 400, NRF 105 may identify NF instances (e.g., of the requested type(s)) that are located within a particular threshold distance from the location associated with the request (e.g., indicated by the "preferred-locality" parameter or otherwise determined by NRF 105).

Process 500 may further include determining (at 506) that at least a threshold quantity of NF instances have not been identified based on the "preferred-locality" parameter. For example, assume that the threshold quantity is three, and that NRF 105 identified (at 504) two instances of the requested NF type based on the location associated with the request (e.g., the "preferred-locality" parameter). In this instance, NRF 105 may determine (at 506) that the threshold quantity of NF instances have not been identified.

Process 500 may also include identifying (at 508) one or more NF instances based on designated locations associated with NRF 105. For example, as discussed above with respect to block 308 of process 300, NRF 105 may identify one or more NF instances that have been identified and/or ranked based on proximity to designated locations associated with NRF 105 (e.g., designated primary, secondary, tertiary, etc. locations). Continuing with the example above in which two NF instances were identified (at 504), which is less than the example threshold of three NF instances, NRF 105 may further identifying (at 508) one more NF instance, thus bringing the total to three identified NF instances.

Process 500 may also include ranking (at 510) the identified NF instances based on distance from, and/or proximity to, the location associated with the request (e.g., as indicated by the "preferred-locality" parameter). For example, as similarly described above with respect to block 410 of process 400, NRF 105 may rank the NF instances (identified at 504 and 508) in order, based on distance from the location associated with the requesting NF. For example, as discussed above, a highest ranked instance of a particular NF may be the closest instance of that particular NF type to the location associated with the consumer NF. In some embodiments, NRF 105 may rank all of the NF instances identified (at 504) based on the location associated with the request ahead of all of the NF instances identified (at 508) based on designated locations associated with NRF 105. In some embodiments, NRF 105 may rank of all of the NF instances identified (at 508) based on designated locations associated with NRF 105 ahead of all of the NF instances identified (at 504) based on the location associated with the request. In some embodiments, NRF 105 may rank the NF instances (identified at 504 and 508) without regard to whether such NF instances were identified based on the location associated with the request or based on the designated locations associated with NRF 105. In some embodiments, NRF 105 may rank the NF instances (identified at 504 and 508) in some other suitable manner.

Process 500 may further include providing (at 512) the ranked set of NF instances to the consumer NF from which the request was received (at 502). As similarly described above, the ranked set of NF instances may include IP addresses, FQDNs, and/or other identifiers that the consumer NF may use to communicate with the requested NF instances.

Figure 6:
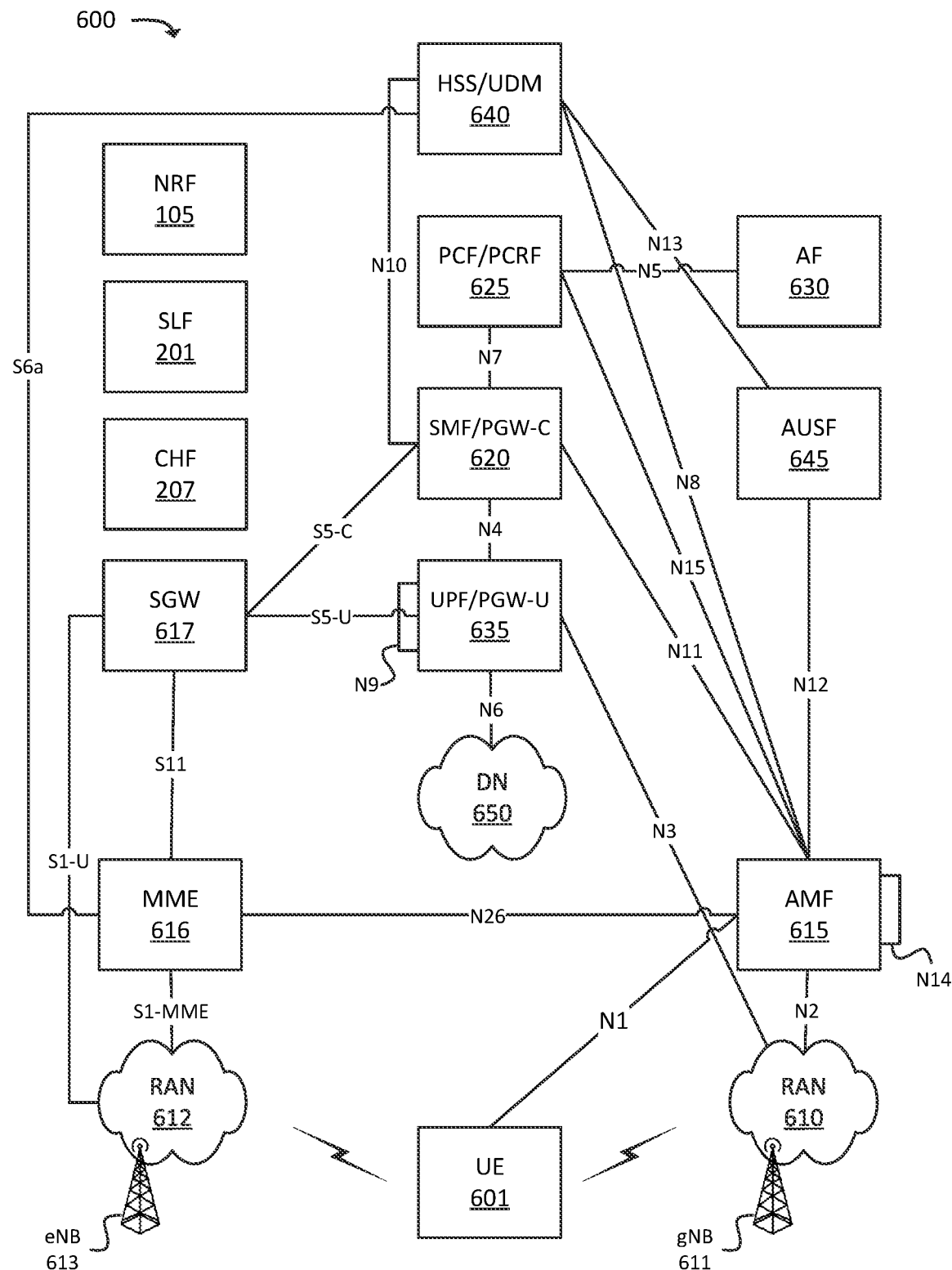
FIG. 6 illustrates an example environment in which one or more embodiments, described herein, may be implemented.

FIG. 6 illustrates an example environment 600, in which one or more embodiments may be implemented. In some embodiments, environment 600 may correspond to a 5G network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 601, RAN 610 (which may include one or more Next Generation Node Bs ("gNBs") 611), RAN 612 (which may include one or more evolved Node Bs ("eNBs") 613), and various network functions such as AMF 209, Mobility Management Entity ("MME") 616, SGW 617, Session Management Function ("SMF")/Packet Data Network ("PDN") Gateway ("PGW")-Control plane function ("PGW-C") 620, PCF/Policy Charging and Rules Function ("PCRF") 625, Application Function ("AF") 630, User Plane Function ("UPF")/PGW-User plane function ("PGW-U") 635, Home Subscriber Server ("HSS")/UDM 640, Authentication Server Function ("AUSF") 645, NRF 105, SLF 201, and CHF 207. Environment 600 may also include one or more networks, such as Data Network ("DN") 650.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 601 may include a computation and communication device, such as a wireless mobile communication device that is capable of communicating with RAN 610 and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, a Mobile-to-Mobile ("M2M") device, or another type of mobile computation and communication device. UE 601 may send traffic to and/or receive traffic (e.g., user plane traffic) from DN 650 via RAN 610 and UPF/PGW-U 635.

RAN 610 may be, or may include, a 5G RAN that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, AMF 209, and/or one or more other devices or networks) and may communicate the traffic to UE 601 via the air interface.

RAN 612 may be, or may include, an LTE RAN that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, SGW 617, and/or one or more other devices or networks) and may communicate the traffic to UE 601 via the air interface.

AMF 209 may include one or more devices, systems, VNFs, etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 610 and/or gNBs 611, and/or to perform other operations. In some embodiments, the 5G network may include multiple AMFs 209, which communicate with each other via the N14 interface (denoted in FIG. 6 by the line marked "N14" originating and terminating at AMF 209).

MME 616 may include one or more devices, systems, VNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate in the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625). In some embodiments, PCF/PCRF 625 may be, may include, and/or may be implemented by, PCF 203.

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices). In some embodiments, multiple UPFs 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 601. In some embodiments, HSS/UDM 640 may be, may include, and/or may be implemented by, UDM 205.

NRF 105 may include one or more devices, systems, VNFs, etc., that receive and/or maintain topology information associated with a network, such as a network implemented in a manner shown in FIG. 6. For example, NRF 105 may maintain identifiers (e.g., IP addressed, FQDNs, or the like) of one or more of the devices, systems, NFs, VNFs, etc., of the network. For example, as discussed above, some or all of the NFs of the network may be implemented on configurable hardware, and multiple instances of the same NF may be deployed in the network. In some embodiments, NRF 105 may receive and/or maintain location information indicating a location at which each such NF instance is located. While one NRF 105 is shown here, multiple NRFs 105 may be deployed in the network. NRF 105 may, as discussed above, receive discovery requests from one or more NFs, where the discovery requests include requests for a given type of NF. NRF 105 may respond to the discovery requests with identifiers (e.g., IP addresses, FQDNs, etc.) of one or more NF instances of the requested type. As discussed above, NRF 105 may identify the one or more requested NF instances based on designated locations associated with NRF 105, a location specified in the discovery request, and/or other criteria.

SLF 201 may include one or more devices, systems, VNFs, etc., that maintain and/or provide information indicating a particular HSS/UDM 640 (or instance thereof) that stores information associated with a particular subscriber or UE 601.

CHF 207 may include one or more devices, systems, VNFs, etc., that maintain and/or provide information regarding charging or usage of services provided by one or more of the devices, systems, or VNFs shown in FIG. 6. For example, CHF 207 may track or calculate an amount of data transmitted to or from a particular UE 601.

For the sake of clarity, NRF 105, SLF 201, and CHF 207 are shown in FIG. 6 without connections to other devices, systems, or VNFs shown in FIG. 6. In practice, NRF 105, SLF 201, CHF 207, and/or one or more other devices, systems, or VNFs may be communicatively coupled to some or all of the devices, systems, or VNFs depicted in FIG. 6.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 601 may communicate, through DN 650, with data servers, other UEs 601, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate.

Figure 7:
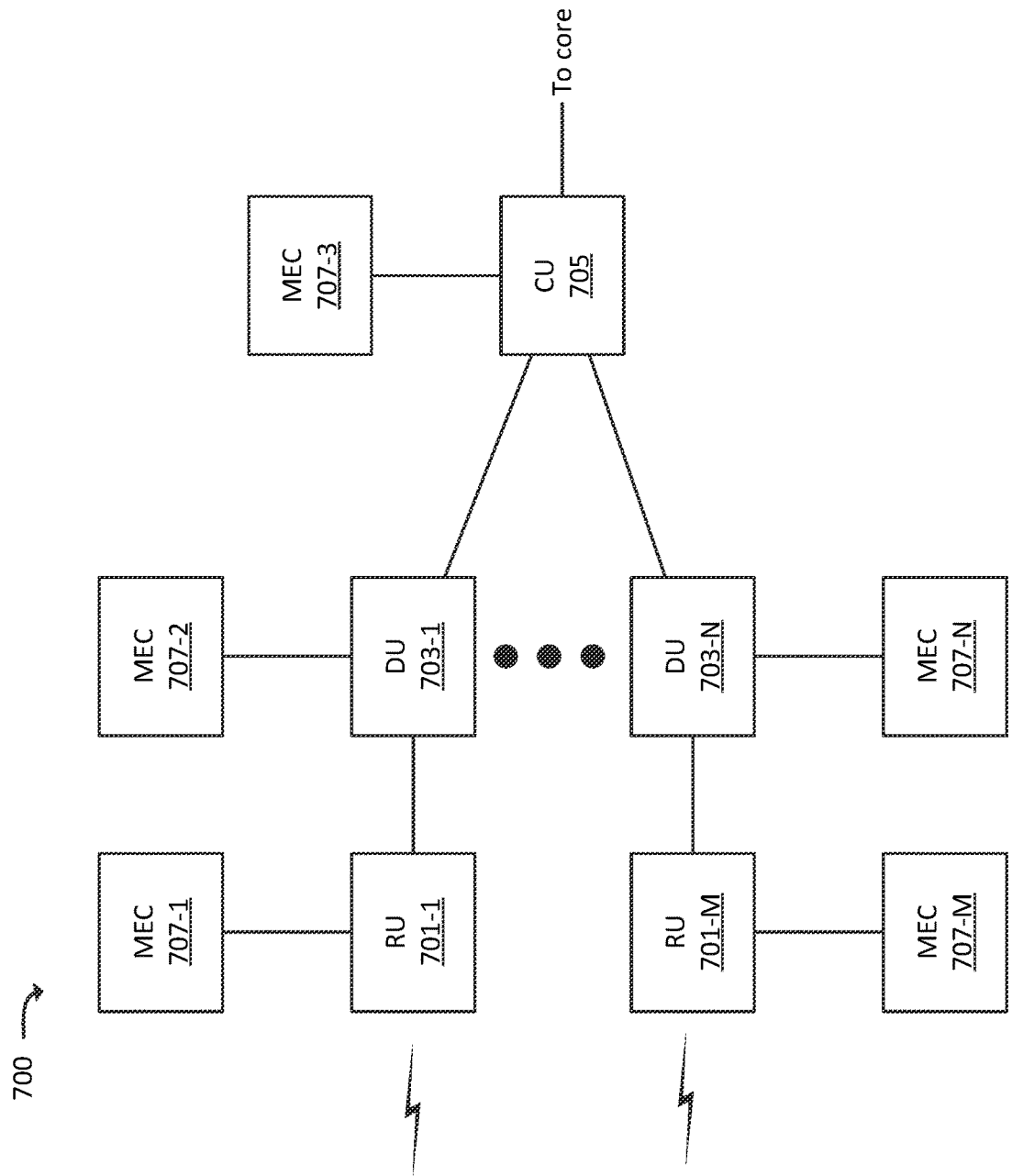
FIG. 7 illustrates an example arrangement of a RAN, in accordance with some embodiments.

FIG. 7 illustrates an example Distributed Unit ("DU") network 700, which may be included in and/or implemented by one or more RANs (e.g., RAN 610). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Control Unit ("CU") 705, one or more Distributed Units ("DUs") 703-1 through 703-N (referred to individually as "DU 703," or collectively as "DUs 703"), and one or more Remote Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 209 and/or UPF/PGW-U 635). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

RUs 701 may, in some embodiments, be communicatively coupled to one or more Multi-Access/Mobile Edge Computing ("MEC") devices, referred to sometimes herein simply as ("MECs") 707. For example, RU 701-1 may be communicatively coupled to MEC 707-1, RU 701-M may be communicatively coupled to MEC 707-M, DU 703-1 may be communicatively coupled to MEC 707-2, DU 1103-N may be communicatively coupled to MEC 707-N, CU 1105 may be communicatively coupled to MEC 707-3, and so on. MECs 707 may include hardware resources (e.g., configurable or provisionable hardware resources) that may be configured to provide services and/or otherwise process traffic to and/or from UE 601, via a respective RU 701.

For example, RU 701-1 may route some traffic, from UE 601, to MEC 707-1 instead of to a core network (e.g., via DU 703 and CU 705). MEC 707-1 may process the traffic, perform one or more computations based on the received traffic, and may provide traffic to UE 601 via RU 701-1. In this manner, ultra-low latency services may be provided to UE 601, as traffic does not need to traverse DU 703, CU 705, and an intervening backhaul network between DU network 700 and the core network. In some embodiments, MEC 707 may include, and/or may implement some or all of the functionality described above with respect to NRF 105, a consumer NF, or a producer NF.

Figure 8:
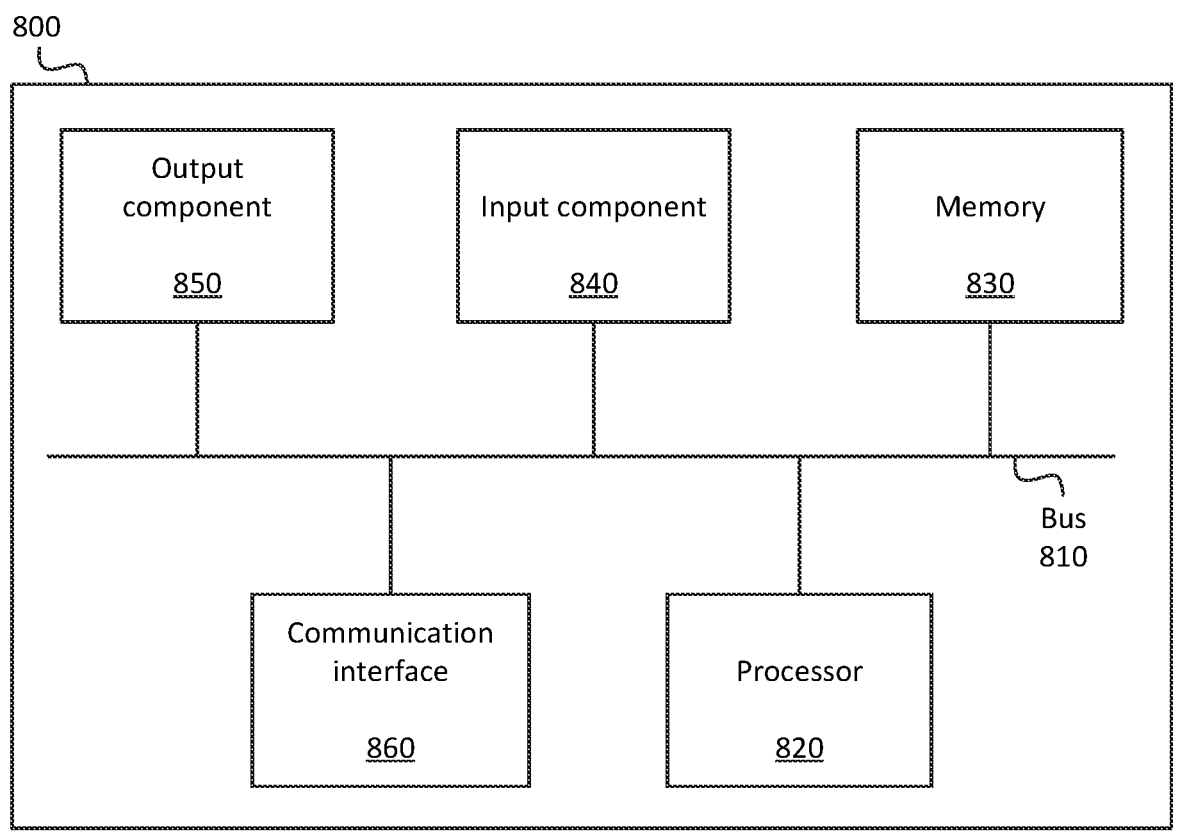
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 2A, 2B, and 3-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a discovery request for a particular type of network function ("NF"), wherein the discovery request is associated with a particular location;
rank a plurality of instances of the particular type of NF based on the particular location associated with the discovery request and respective locations of the plurality of instances of the particular type of NF;
select, based on the ranking, a particular instance of the particular type of NF from the plurality of instances of the particular type of NF; and
provide, in response to the discovery request, an identifier of the selected particular instance of the particular type of NF.

2. The device of claim 1, wherein ranking the plurality of instances of the particular type of NF includes ranking the plurality of instances of the particular NF based on a respective distance of each instance of the particular type of NF from the particular location associated with the discovery request.

3. The device of claim 2, wherein the ranking is further based on a respective measure of load associated with each instance of the particular type of NF.

4. The device of claim 1, wherein the ranking is further based on a respective measure of load associated with each instance of the particular type of NF.

5. The device of claim 1, wherein the request is received from a requesting device, wherein the ranking is further based on a quantity of routing hops between the requesting device and each respective instance of the particular type of NF.

6. The device of claim 1, wherein identifying the location associated with the discovery request includes identifying a location specified by the discovery request.

7. The device of claim 6, wherein identifying the location specified by the discovery request includes identifying a preferred-locality parameter included in the discovery request.

8. A non-transitory computer-readable medium, storing a plurality of processor-executable instructions to:
receive a discovery request for a particular type of network function ("NF"), wherein the discovery request is associated with a particular location;

rank a plurality of instances of the particular type of NF based on the particular location associated with the discovery request and respective locations of the plurality of instances of the particular type of NF;

select, based on the ranking, a particular instance of the particular type of NF from the plurality of instances of the particular type of NF; and provide, in response to the discovery request, an identifier of the selected particular instance of the particular type of NF.

9. The non-transitory computer-readable medium of claim 8, wherein ranking the plurality of instances of the particular type of NF includes ranking the plurality of instances of the particular NF based on a respective distance of each instance of the particular type of NF from the particular location associated with the discovery request.

10. The non-transitory computer-readable medium of claim 9, wherein the ranking is further based on a respective measure of load associated with each instance of the particular type of NF.

11. The non-transitory computer-readable medium of claim 8, wherein the ranking is further based on a respective measure of load associated with each instance of the particular type of NF.

12. The non-transitory computer-readable medium of claim 8, wherein the request is received from a requesting device, wherein the ranking is further based on a quantity of routing hops between the requesting device and each respective instance of the particular type of NF.

13. The non-transitory computer-readable medium of claim 8, wherein identifying the location associated with the discovery request includes identifying a location specified by the discovery request.

14. The non-transitory computer-readable medium of claim 13, wherein identifying the location specified by the discovery request includes identifying a preferred-locality parameter included in the discovery request.

15. A method, comprising:
receiving a discovery request for a particular type of network function ("NF"), wherein the discovery request is associated with a particular location;

ranking a plurality of instances of the particular type of NF based on the particular location associated with the discovery request and respective locations with which the plurality of instances of the particular type of NF are associated;

selecting, based on the ranking, a particular instance of the particular type of NF from the plurality of instances of the particular type of NF; and providing, in response to the discovery request, an identifier of the selected particular instance of the particular type of NF.

16. The method of claim 15, wherein ranking the plurality of instances of the particular type of NF includes ranking the plurality of instances of the particular NF based on a respective distance of each instance of the particular type of NF from the particular location associated with the discovery request, wherein the ranking is further based on a respective measure of load associated with each instance of the particular type of NF.

17. The method of claim 15, wherein the ranking is further based on a respective measure of load associated with each instance of the particular type of NF.

18. The method of claim 15, wherein the request is received from a requesting device, wherein the ranking is further based on a quantity of routing hops between the requesting device and each respective instance of the particular type of NF.

19. The method of claim 15, wherein identifying the location associated with the discovery request includes identifying a location specified by the discovery request.

20. The method of claim 19, wherein identifying the location specified by the discovery request includes identifying a preferred-locality parameter included in the discovery request.

* * * * *